US012677167B2

(12) United States Patent　　　　(10) Patent No.:　US 12,677,167 B2
Chen　　　　　　　　　　　　　　　(45) Date of Patent:　　　Jul. 7, 2026

(54) MONITORING BEHAVIOR ADJUSTMENT METHOD AND APPARATUS, TERMINAL, AND NETWORK-SIDE DEVICE

(71) Applicant: VIVO MOBILE COMMUNICATION CO., LTD., Guangdong (CN)

(72) Inventor: Li Chen, Guangdong (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 516 days.

(21) Appl. No.: 18/312,092

(22) Filed: May 4, 2023

(65) Prior Publication Data

US 2023/0292152 A1　　Sep. 14, 2023

Related U.S. Application Data

(63) Continuation of application No. PCT/CN2021/141694, filed on Dec. 27, 2021.

(30) Foreign Application Priority Data

Dec. 31, 2020　(CN) ......................... 202011639332.6

(51) Int. Cl.
*H04W 24/02*　　　(2009.01)
(52) U.S. Cl.
CPC ................................... *H04W 24/02* (2013.01)
(58) Field of Classification Search
CPC ............................... H04W 24/02; H04W 24/10
See application file for complete search history.

(56) References Cited

U.S. PATENT DOCUMENTS

| 2017/0026861 A1 | 1/2017 | Tseng et al. |
| 2017/0150384 A1 | 5/2017 | Rune et al. |
| 2021/0167874 A1 | 6/2021 | Jiang |
| 2022/0131596 A1* | 4/2022 | Sharma ............... H04W 72/542 |

(Continued)

FOREIGN PATENT DOCUMENTS

| CN | 107852631 A | 3/2018 |
| CN | 108307686 A | 7/2018 |
| CN | 109548075 A | 3/2019 |

(Continued)

OTHER PUBLICATIONS

Panasonic, Remaining issues for RRM measurement relaxation, 3GPP TSG-RAN WG2 Meeting#110-e, R2-2004613, Online, Jun .1-Jun. 12, 2020.

(Continued)

*Primary Examiner* — Gbemileke J Onamuti
(74) *Attorney, Agent, or Firm* — Foley & Lardner LLP

(57)　　　　　　　ABSTRACT

A monitoring behavior adjustment method and apparatus, a terminal, and a network-side device are provided. The method includes: obtaining a measurement parameter and an adjustment parameter for a target measurement that are configured by a network side; and performing measurement adjustment on the target measurement based on the measurement parameter and adjustment parameter for the target measurement, where the measurement adjustment is adjusting a mode of the target measurement, and the mode of the target measurement includes measurement relaxation, measurement enhancement, or normal measurement.

16 Claims, 4 Drawing Sheets

(56)                    References Cited

U.S. PATENT DOCUMENTS

| | | |
|---|---|---|
| 2022/0167370 A1 | 5/2022 | Chen |
| 2025/0113235 A1* | 4/2025 | He .......................... H04W 8/24 |

FOREIGN PATENT DOCUMENTS

| | | |
|---|---|---|
| CN | 110839254 A | 2/2020 |
| CN | 111800800 A | 10/2020 |
| CN | 112153688 A | 12/2020 |
| JP | 2021-533652 A | 12/2021 |
| JP | 2022543902 A | 10/2022 |
| WO | 2019194731 A1 | 10/2019 |
| WO | 2020089388 A1 | 5/2020 |
| WO | WO-2020/090094 A1 | 5/2020 |

OTHER PUBLICATIONS

Mediatek Inc., "Report of email discussion [105bis@29][NR/Power Saving] RRM solutions", 3GPP TSG-RAN WG2 Meeting #106, R2-1908249, May 13-17, 2019, Reno, Nevada, USA.
JP Office Action on JP 2024-191155 dtd Sep. 9, 2025.

* cited by examiner

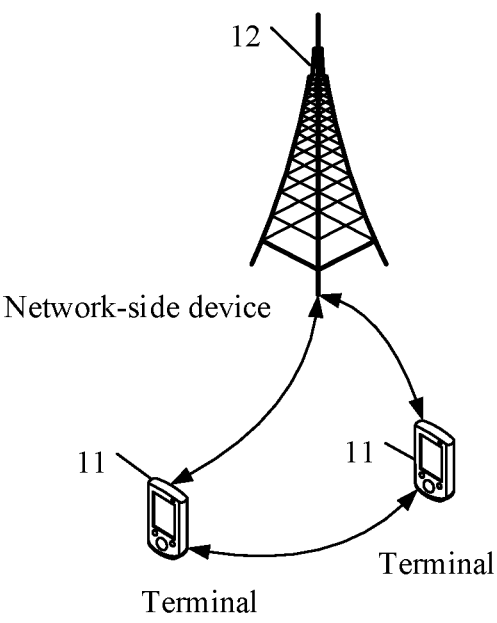

12

Network-side device 11             11

Terminal

Terminal

FIG. 1

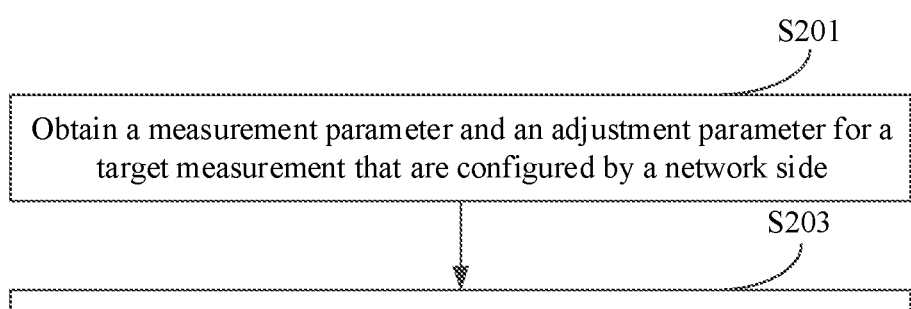

S201

Obtain a measurement parameter and an adjustment parameter for a target measurement that are configured by a network side

S203

Perform measurement adjustment on the target measurement based on the measurement parameter and adjustment parameter for the target measurement, where the measurement adjustment is adjusting a mode of the target measurement, and the mode of the target measurement includes measurement relaxation, measurement enhancement, or normal measurement

FIG. 2

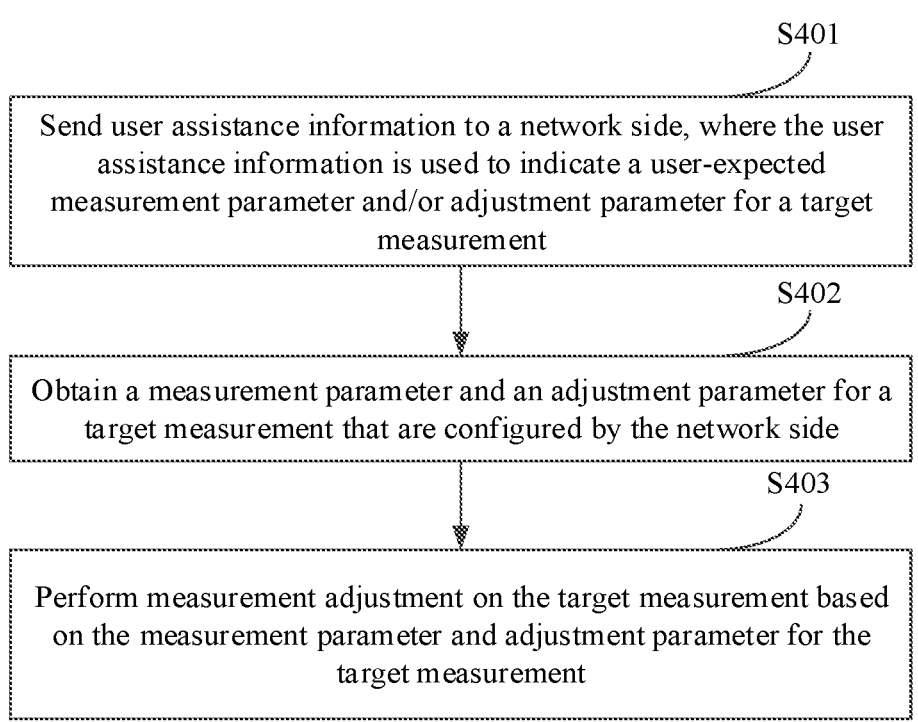

S401

Send user assistance information to a network side, where the user assistance information is used to indicate a user-expected measurement parameter and/or adjustment parameter for a target measurement

S402

Obtain a measurement parameter and an adjustment parameter for a target measurement that are configured by the network side

S403

Perform measurement adjustment on the target measurement based on the measurement parameter and adjustment parameter for the target measurement

FIG. 4

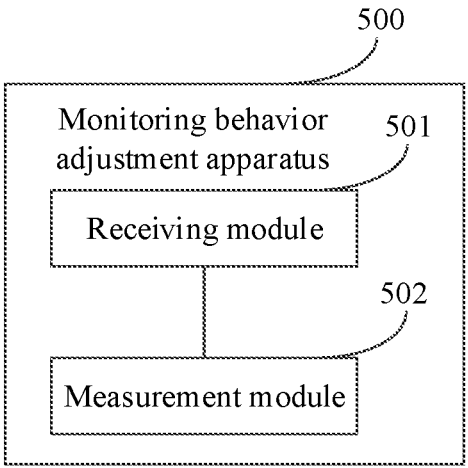

500

Monitoring behavior adjustment apparatus    501

Receiving module

502

Measurement module

FIG. 5

MONITORING BEHAVIOR ADJUSTMENT METHOD AND APPARATUS, TERMINAL, AND NETWORK-SIDE DEVICE

CROSS-REFERENCE TO RELATED APPLICATIONS

The present application is a continuation application of PCT International Application No. PCT/CN2021/141694 filed on Dec. 27, 2021, which claims priority to Chinese Patent Application No. 202011639332.6, filed with the China National Intellectual Property Administration on Dec. 31, 2020 and entitled "MONITORING BEHAVIOR ADJUSTMENT METHOD AND APPARATUS, AND TERMINAL", which are incorporated in their entireties by reference herein.

TECHNICAL FIELD

This application pertains to the field of wireless communication technologies, and specifically, relates to a monitoring behavior adjustment method and apparatus, a terminal, and a network-side device.

BACKGROUND

A terminal in an energy-saving state skips monitoring physical downlink control channels (PDCCH) in one or more subsequent discontinuous reception (DRX) cycles based on an indication of downlink control information (DCI) of PDCCH or an early indication signal, for example, a WUS, a GTS (go to sleep), or a pre-indication. That is, the terminal does not need to wake up during DRX onDuration to monitor PDCCHs.

To guarantee reliability of a radio link and/or beam, the terminal needs to perform radio link monitoring (Radio Link Monitor, RLM) and/or beam failure detection (BFD) periodically according to specific requirements. For example, the terminal wakes up to perform RLM and/or BFD in each DRX cycle or several DRX cycles.

During RLM/BFD, the terminal needs to perform corresponding measurement adjustment based on a measurement result. In this case, if receiving a parameter that is re-configured for the terminal by a network side, the terminal may be unable to adapt to the network configuration quickly, thus affecting mobility performance of the terminal.

SUMMARY

According to a first aspect, a monitoring behavior adjustment method is provided, executed by a terminal and including:

obtaining a measurement parameter and an adjustment parameter for a target measurement that are configured by a network side; and performing measurement adjustment on the target measurement based on the measurement parameter and adjustment parameter for the target measurement, where the measurement adjustment is adjusting a mode of the target measurement, and the mode of the target measurement includes measurement relaxation, measurement enhancement, or normal measurement.

According to a second aspect, a monitoring behavior adjustment apparatus is provided, including:

a receiving module, configured to obtain a measurement parameter and an adjustment parameter for a target measurement that are configured by a network side; and a measurement module, configured to perform measurement adjustment on the target measurement based on the measurement parameter and adjustment parameter for the target measurement, where the measurement adjustment is adjusting a mode of the target measurement, and the mode of the target measurement includes measurement relaxation, measurement enhancement, or normal measurement.

According to a third aspect, a terminal is provided, where the terminal includes a processor, a memory, and a program or instructions stored in the memory and capable of running on the processor, and when the program or the instructions are executed by the processor, the steps of the method according to the first aspect are implemented.

According to a fourth aspect, a readable storage medium is provided, where a program or instructions are stored in the readable storage medium, and when the program or the instructions are executed by a processor, the steps of the method according to the first aspect are implemented.

According to a fifth aspect, a chip is provided, where the chip includes a processor and a communication interface, the communication interface is coupled to the processor, and the processor is configured to run a program or instructions of a network-side device to implement the method according to the first aspect.

According to a sixth aspect, a program/program product is provided, where the program/program product is stored in a non-transitory storage medium, and the program/program product is executed by a processor to implement the method according to the first aspect.

BRIEF DESCRIPTION OF DRAWINGS

FIG. 1 is a structural block diagram of a wireless communication system to which the embodiments of this application are applicable;

FIG. 2 is a schematic flowchart of a monitoring behavior adjustment method according to an embodiment of this application;

FIG. 4 is still another schematic flowchart of a monitoring behavior adjustment method according to an embodiment of this application;

FIG. 5 is a schematic structural flowchart of a monitoring behavior adjustment apparatus according to an embodiment of this application;

DETAILED DESCRIPTION OF EMBODIMENTS

Figure 3:
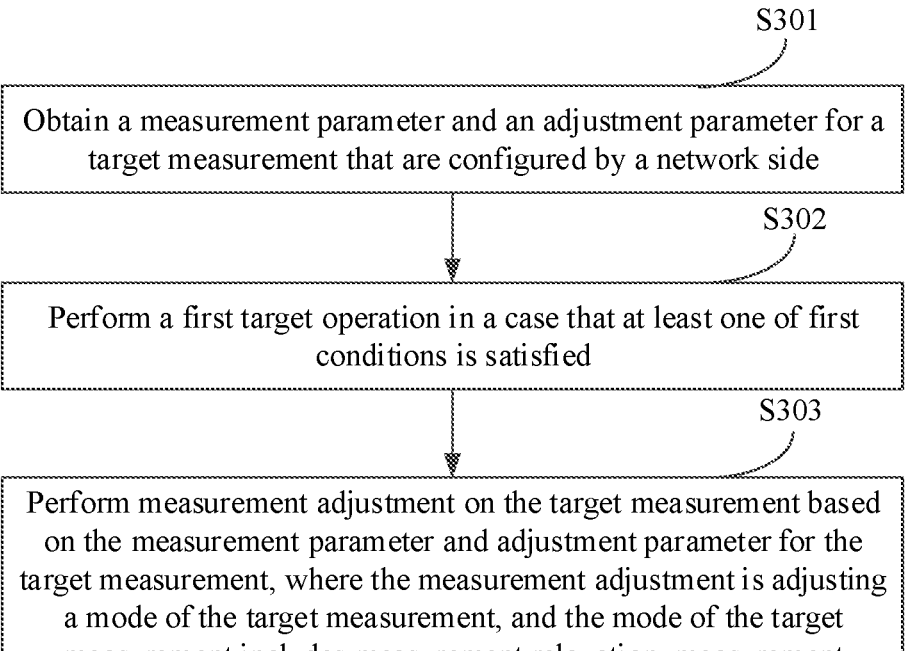
FIG. 3 is another schematic flowchart of a monitoring behavior adjustment method according to an embodiment of this application.

The following clearly describes the technical solutions in the embodiments of this application with reference to the accompanying drawings in the embodiments of this application. Apparently, the described embodiments are only some rather than all of the embodiments of this application. All other embodiments obtained by persons of ordinary skill in the art based on the embodiments of this application without creative efforts shall fall within the protection scope of this application.

In the specification and claims of this application, the terms such as "first" and "second" are intended to distinguish between similar objects but do not necessarily indicate a specific order or sequence. It should be understood that the numbers used in this way are interchangeable in appropriate circumstances so that the embodiments of this application can be implemented in other orders than the order illustrated or described herein, and "first" and "second" are usually for distinguishing same-type objects but not limiting the number of objects. For example, there may be one or more first objects. In addition, "and/or" in this specification and claims indicates at least one of connected objects, and the symbol "I" generally indicates that the associated objects are in an "or" relationship.

It should be noted that technologies described in the embodiments of this application are not limited to a long term evolution (LTE)/LTE-advanced (LTE-A) system, and may also be used in various wireless communication systems, such as code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" in the embodiments of this application are usually used interchangeably. Techniques described herein may be used in the aforementioned systems and radio technologies, and may also be used in other systems and radio technologies. However, in the following descriptions, a new radio (NR) system is described for an illustration purpose, and NR terms are used in most of the following descriptions, although these technologies may also be applied to other applications than an NR system application, for example, the 6th generation (6G) communication system.

FIG. 1 is a block diagram of a wireless communication system to which the embodiments of this application are applicable. The wireless communication system includes a terminal 11 and a network-side device 12. The terminal 11 may also be referred to as a terminal device or user terminal (User Equipment, UE), and the terminal 11 may be a terminal-side device, such as a mobile phone, a tablet computer (Tablet Personal Computer), a laptop computer or a notebook computer, a personal digital assistant (PDA), a palmtop computer, a netbook, an ultra-mobile personal computer (UMPC), a mobile Internet device (MID), a wearable device or vehicle user equipment (VUE), or pedestrian user equipment (PUE). The wearable device includes: a wrist band, earphones, glasses, or the like. It should be noted that a specific type of the terminal 11 is not limited in the embodiments of this application. The network-side device 12 may be a base station or a core network. The base station may be referred to as an access point, a base transceiver station (BTS), a radio base station, a radio transceiver, a basic service set (BSS), an extended service set (ESS), a NodeB, an evolved NodeB (eNB), a home NodeB, a home evolved NodeB, a WLAN access point, a Wi-Fi node, a transmission-reception point (Transmitting Receiving Point, TRP), or another appropriate term in the art. Provided that a same technical effect is achieved, the base station is not limited to a specific technical term. It should be noted that in the embodiments of this application, the base station in the NR system is merely used as an example, and a specific type of the base station is not limited.

The following describes in detail a monitoring behavior adjustment method provided in the embodiments of this application by using specific embodiments and application scenarios thereof with reference to the accompanying drawings.

FIG. 2 is a schematic flowchart of a monitoring behavior adjustment method according to an embodiment of this application. This method may be executed by a terminal, in other words, the method may be executed by software or hardware installed in the terminal. As shown in FIG. 2, the method may include the following steps.

Step S201: Obtain a measurement parameter and an adjustment parameter for a target measurement that are configured by a network side.

The target measurement includes at least one of the following:

measurement corresponding to radio link monitoring (RLM);

measurement corresponding to beam failure detection (BFD); and measurement corresponding to radio resource management (RRM).

After step S201, the method further includes:

performing a first target operation, where the terminal may perform the first target operation after receiving configuration from the network side.

The first target operation includes at least one of the following operations:

stopping corresponding counting and/or timing for determining to enter the measurement adjustment;

stopping corresponding counting and/or timing for determining to exit the measurement adjustment;

restarting corresponding counting and/or timing for determining to enter the measurement adjustment;

restarting corresponding counting and/or timing for determining to exit the measurement adjustment;

returning to the normal measurement;

skipping performing measurement relaxation; and skipping performing measurement enhancement.

Step S203: Perform measurement adjustment on the target measurement based on the measurement parameter and adjustment parameter for the target measurement, where the measurement adjustment is adjusting a mode of the target measurement, and the mode of the target measurement includes measurement relaxation, measurement enhancement, or normal measurement.

Using RLM and BFD as examples, the following uses examples to describe the measurement relaxation or measurement enhancement of the target measurement as well as a trigger condition.

RLM/BFD measurement relaxation may include at least one of the following:

1. RLM/BFD measurement relaxation in time domain is performed, including:

(a) extension of an RLM/BFD measurement period L1 or reduction of the number of measurement samples;

(b) use of a measurement period P1 for normal measurement, use of a measurement period P2 for measurement relaxation, and use of a measurement period P3 for measurement enhancement, where $P3<P2<P1$; or (c) extension of a gap of RLM/BFD measurement L2/L3 indication.

2. In a period of time, no RLM/BFD measurement is performed, or less RLM and/or BFD measurement is performed.

3. In a period of time, no RLM/BFD higher-layer indication is performed, or less RLM/BFD higher-layer indication is performed.

4. No RLM/BFD measurement is performed on resources satisfying a condition until returning to normal measurement or measurement enhancement.

5. Fewer resources are measured.

6. RLM/BFD measurement relaxation in space domain is performed, that is, the number of beams for RLM/BFD measurement is reduced, or measurement relaxation is performed in time domain and frequency domain corresponding to the beams.

7. The number of reference signals for RLM/BFD measurement is reduced.

Correspondingly, RLM/BFD measurement enhancement may include opposite content of the measurement relaxation described above.

Measurement adjustment allows the target measurement to be adjusted between measurement relaxation, measurement enhancement, and normal measurement, so that the terminal can better adapt to a current network configuration. However, the target measurement may gradually deviate from normal measurement as measurement adjustment proceeds. If a fallback mechanism of RLM/BFD relaxation is not considered, when the network reconfigures a parameter for the terminal, the terminal cannot quickly adapt to the configuration of the network, thereby affecting mobility performance of the terminal.

Therefore, in this embodiment of this application, the terminal obtains the measurement parameter and adjustment parameter for the target measurement that are configured by the network side, and performs the first target operation to implement measurement adjustment on the target measurement based on the measurement parameter and adjustment parameter for the target measurement, so that the terminal can quickly return to a normal measurement mode when the configuration has changed, thereby quickly adapting to a network configuration. This implements power saving without affecting performance of the target measurement and mobility performance of the terminal.

FIG. 3 is another schematic flowchart of a monitoring behavior adjustment method according to an embodiment of this application. This method may be executed by a terminal, in other words, the method may be executed by software or hardware installed in the terminal. As shown in FIG. 3, the method may include the following steps.

Step S301: Obtain a measurement parameter and an adjustment parameter for a target measurement that are configured by a network side.

Step S301 is performed the same as step S201 in FIG. 2, with the same or similar results achieved. For brevity, details are not repeated herein.

Step S302: Perform a first target operation in a case that at least one of first conditions is satisfied.

In the case that at least one of first conditions is satisfied, indicating a change in configuration, the terminal may perform the first target operation.

The first conditions include the following conditions:

the measurement parameter has changed, for example, the measurement parameter has been reconfigured, where the measurement parameter includes: bandwidth part (BWP), reference signal (RS), T310, N310, N311, BFI Max number, and the like;

the adjustment parameter has changed, for example, the adjustment parameter has been reconfigured;

a serving cell has changed, which may include at least one of the following: the serving cell of the terminal has been reconfigured, synchronous reconfiguration occurs in the serving cell of the terminal, a primary cell (Pcell) of the terminal has been switched (change), a primary secondary cell (Pcell) of the terminal has been changed, and a secondary cell (Scell) of the terminal has been changed;

a status of the serving cell has changed, which may include: a cell status of at least one of the following serving cells is switched between a plurality of states; where the serving cell includes a secondary cell Scell, a primary secondary cell Pscell, a secondary cell group (SCG), a primary cell Pcell, and a master cell group (MCG); and the plurality of states include at least one of the following: activation, deactivation, dormancy, and suspend;

a transmission configuration indicator state (TCI state) of a control resource set (Coreset) indicated by the network side has changed, which is, for example, indicated by using a medium access control control element (MAC CE); where the TCI state is used for performing target measurement on a reference signal resource corresponding to a TCI state of a physical resource set Coreset #0 in a case that the reference signal corresponding to the target measurement is not configured;

downlink control information (DCI) indicates bandwidth part (BWP) switching; and a timer controls bandwidth part (BWP) switching.

In an implementation, in a case that the terminal performs corresponding counting and/or timing for determining to enter the measurement adjustment or performs corresponding counting and/or timing for determining to exit the measurement adjustment, specifically, for example, when the terminal being in measurement relaxation performs determining for measurement enhancement or normal measurement, or when the terminal being in measurement enhancement performs determining for measurement relaxation or normal measurement, if the terminal determines that the foregoing first condition is satisfied, the terminal performs the first target operation, where the first target operation includes at least one of the following operations:

stopping corresponding counting and/or timing for determining to enter the measurement adjustment, that is, the terminal stops part or all of counters and/or timers related to a trigger condition for determining to enter the measurement adjustment;

stopping corresponding counting and/or timing for determining to exit the measurement adjustment, that is, the terminal stops part or all of counters and/or timers related to a trigger condition for determining to exit the measurement adjustment;

restarting corresponding counting and/or timing for determining to enter the measurement adjustment, that is, the terminal restarts part or all of counters and/or timers related to a trigger condition for determining to enter the measurement adjustment; and restarting corresponding counting and/or timing for determining to exit the measurement adjustment, that is, the terminal restarts part or all of counters and/or timers related to a trigger condition for determining to exit the measurement adjustment.

In another implementation, in a case that the target measurement is measurement relaxation or measurement enhancement, the terminal performs the first target operation if the terminal determines that the foregoing first condition has occurred. The first target operation includes at least one of the following operations:

stopping corresponding counting and/or timing for determining to enter the measurement adjustment, that is, the terminal stops part or all of counters and/or timers related to a trigger condition for determining to enter the measurement adjustment;

stopping corresponding counting and/or timing for determining to exit the measurement adjustment, that is, the terminal stops part or all of counters and/or timers related to a trigger condition for determining to exit the measurement adjustment;

restarting corresponding counting and/or timing for determining to enter the measurement adjustment, that is, the terminal restarts part or all of counters and/or timers related to a trigger condition for determining to enter the measurement adjustment;

restarting corresponding counting and/or timing for determining to exit the measurement adjustment, that is, the terminal restarts part or all of counters and/or timers related to a trigger condition for determining to exit the measurement adjustment;

returning to the normal measurement, that is, the terminal returns to the normal measurement from measurement relaxation or measurement enhancement;

skipping performing measurement relaxation; and skipping performing measurement enhancement.

In an implementation, when the terminal performs the target measurement on a plurality of resources simultaneously, step S302 includes:

in a case that the target measurement is performed on a plurality of resources simultaneously and a first resource of the plurality of resources satisfies at least one of the first conditions, performing the first target operation on a second resource, where the second resource is one of the following resources:

the first resource, the plurality of resources, and part of the plurality of resources, where the part of the plurality of resources include the first resource.

In an implementation, the plurality of resources include at least one of the following resources:

a plurality of beams;

a plurality of bandwidth parts (BWP);

a plurality of transmission-reception points (transmission/reception point, TRP);

a plurality of cells, carriers, or component carriers (CC), that is, a plurality of CCs within a cell group (CG) or carrier aggregation (CA);

a plurality of reference signals (RS);

a plurality of RS sets; and a plurality of cell groups (CG).

Step S303: Perform measurement adjustment on the target measurement based on the measurement parameter and adjustment parameter for the target measurement.

Step S303 is performed the same as step S203 in FIG. 2, with the same or similar results achieved. For brevity, details are not repeated herein.

In this embodiment of this application, in a case that the first condition is satisfied, the terminal performs the first target operation. In this way, when the terminal determines that a received configuration from the network side has changed, the terminal performs a corresponding return operation to quickly return to a normal measurement mode, thereby implementing power saving without affecting performance of the target measurement and mobility performance of the terminal.

During configuration of the measurement parameter and adjustment parameter for the target measurement for the terminal, the network side possibly cannot accurately estimate a status of the terminal, including a moving speed, a channel state, or an environment in which the terminal is located, and therefore cannot accurately and dynamically configure an appropriate measurement parameter and adjustment parameter for the terminal.

FIG. 4 is another schematic flowchart of a monitoring behavior adjustment method according to an embodiment of this application. This method may be executed by the terminal, in other words, the method may be executed by software or hardware installed in the terminal. As shown in FIG. 4, the method may include the following steps.

Step S401: Send user assistance information (UE assistance information) to a network side, where the user assistance information is used to indicate a user-expected measurement parameter and/or adjustment parameter for a target measurement.

The user-expected (expected) measurement parameter and/or adjustment parameter for the target measurement may include: user preferred (preferred) or user requested (requested) measurement parameter and/or adjustment parameter for the target measurement.

In an implementation, the user-expected measurement parameter includes at least one of the following:

a user-expected threshold for a related timer before the measurement adjustment and/or a user-expected threshold for a related counter before the measurement adjustment, for example, T310, T311, N310, N311, or BFI counter;

a user-expected threshold for a related timer after the measurement adjustment and/or a user-expected threshold for a related counter after the measurement adjustment, for example, T310, T311, N310, N311, or BFI counter;

a user-expected measurement period before the measurement adjustment and/or a user-expected measurement period after the measurement adjustment;

a user-expected measurement gap before the measurement adjustment and/or a user-expected measurement gap after the measurement adjustment;

a user-expected measurement requirement before the measurement adjustment and/or a user-expected measurement requirement after the measurement adjustment;

a user-expected duration for not performing measurement, that is, for how long the target measurement does not need to be performed;

a user-expected duration for performing measurement, that is, for how long the target measurement needs to be performed;

a user-expected requirement parameter for the target measurement; and a user-expected scaling factor after measurement adjustment, that is, a scaling factor for measurement relaxation or measurement enhancement after the measurement adjustment, including: a multiple of measurement relaxation, for example, a multiple of measurement periods or gaps, a multiple of measurement requirement, or a multiple of measurement enhancement, for example, a multiple of the number of measurement samples.

In an implementation, the adjustment parameter includes at least one of the following:

a user-expected trigger condition for the measurement adjustment, that is, a predetermined rule, where the trigger condition or predetermined rule herein includes: triggering the measurement adjustment when it is determined that a predetermined condition is satisfied by the terminal, where the predetermined condition may be a condition configured by the network side or a condition specified by a protocol, including at least one of the following: (a) when the terminal is at a cell center (which is, for example, determined by comparing measurement performance of a current and/or neighboring cell with a predetermined threshold); (b) when the terminal moves at a low speed (which is, for example, determined by comparing an amount of change of measurement performance of a current and/or neighboring cell with a predetermined threshold); (c) when the terminal detects a number of in-sync indications (In-Sync, IS), out-of-sync indications (Out-Of-Sync, OOS), beam failure instance (BFI), or the like; or a preset condition specified by other protocols;

a user-expected threshold for a corresponding counter for determining to enter or exit the measurement adjustment; and/or a user-expected threshold for a corresponding timer for determining to enter or exit the measurement adjustment; and user-expected measurement adjustment, that is, a user-expected mode of the target measurement for which the measurement adjustment can be performed.

In an implementation, before step S401, the method further includes:

the terminal obtains, from the network side, a configuration for sending the user assistance information, so that the terminal can send the user assistance information as required.

Step S402: Obtain a measurement parameter and an adjustment parameter for a target measurement that are configured by the network side.

Step S403: Perform measurement adjustment on the target measurement based on the measurement parameter and adjustment parameter for the target measurement.

Steps S402 and S403 are performed the same as steps S201 and S203 in FIG. 2, with the same or similar effects achieved. For brevity, details are not repeated herein. Step S401 may alternatively be executed after steps S402 and S403, and step S401 being first performed is used as an example in this embodiment of this application.

In this embodiment of this application, the terminal sends the user assistance information to the network side, where the user assistance information is used to indicate the user-expected measurement parameter and/or adjustment parameter for the target measurement, so that the network side configures the measurement parameter and adjustment parameter for the target measurement based on the user assistance information, so as to configure an appropriate measurement parameter and adjustment parameter more accurately and dynamically for the terminal.

It should be noted that the monitoring behavior adjustment method provided in the embodiments of this application may be executed by a monitoring behavior adjustment apparatus or by a control module for executing the monitoring behavior adjustment method in the monitoring behavior adjustment apparatus. In the embodiments of this application, the monitoring behavior adjustment apparatus provided by the embodiments of this application is described by using an example in which the monitoring behavior adjustment apparatus executes the monitoring behavior adjustment method.

FIG. 5 is a schematic structural flowchart of a monitoring behavior adjustment apparatus according to an embodiment of this application. As shown in FIG. 5, the apparatus 500 includes a receiving module 501 and a measurement module 502.

The receiving module 501 is configured to obtain a measurement parameter and an adjustment parameter for a target measurement that are configured by a network side.

The measurement module 502 is configured to perform measurement adjustment on the target measurement based on the measurement parameter and adjustment parameter for the target measurement, where the measurement adjustment is adjusting a mode of the target measurement, and the mode of the target measurement includes measurement relaxation, measurement enhancement, or normal measurement.

The measurement module 502 is further configured to perform a first target operation.

The first target operation includes at least one of the following operations:

stopping corresponding counting and/or timing for determining to enter the measurement adjustment;

stopping corresponding counting and/or timing for determining to exit the measurement adjustment;

restarting corresponding counting and/or timing for determining to enter the measurement adjustment;

restarting corresponding counting and/or timing for determining to exit the measurement adjustment;

returning to the normal measurement;

skipping performing measurement relaxation; and skipping performing measurement enhancement.

Therefore, in this embodiment of this application, the terminal obtains the measurement parameter and adjustment parameter for the target measurement that are configured by the network side, and performs the first target operation to implement measurement adjustment on the target measurement based on the measurement parameter and adjustment parameter for the target measurement, so that the terminal can quickly return to a normal measurement mode when the configuration has changed, thereby quickly adapting to a network configuration. This implements power saving without affecting performance of the target measurement and mobility performance of the terminal.

Optionally, the measurement module is further configured to perform the first target operation in a case that at least one of first conditions is satisfied.

The first conditions include the following conditions:

the measurement parameter has changed;

the adjustment parameter has changed;

a serving cell has changed;

a status of the serving cell has changed;

a transmission configuration indicator state of a control resource set indicated by the network side has changed;

downlink control information indicates bandwidth part switching; and a timer controls bandwidth part switching.

Further, that the serving cell has changed includes at least one of the following:

reconfiguration occurs in the serving cell;

synchronous reconfiguration occurs in the serving cell;

a primary cell has been switched;

a primary secondary cell has changed; and a secondary cell has changed.

Further, that the serving cell has changed includes: a cell status of at least one of the following serving cells is switched between a plurality of states.

The serving cell includes a secondary cell, a primary secondary cell, a secondary cell group, a primary cell, and a master cell group.

The plurality of states include at least one of the following:

activation, deactivation, dormancy, and suspend.

Further, in a case that corresponding counting and/or timing for determining to enter the measurement adjustment is performed or corresponding counting and/or timing for determining to exit the measurement adjustment is performed, the first target operation includes at least one of the following operations:

stopping corresponding counting and/or timing for determining to enter the measurement adjustment;

stopping corresponding counting and/or timing for determining to exit the measurement adjustment;

restarting corresponding counting and/or timing for determining to enter the measurement adjustment; and restarting corresponding counting and/or timing for determining to exit the measurement adjustment.

Further, in a case that the target measurement is measurement relaxation or measurement enhancement, the first target operation includes at least one of the following operations:

stopping corresponding counting and/or timing for determining to enter the measurement adjustment;

stopping corresponding counting and/or timing for determining to exit the measurement adjustment;

restarting corresponding counting and/or timing for determining to enter the measurement adjustment;

restarting corresponding counting and/or timing for determining to exit the measurement adjustment;

returning to the normal measurement;

skipping performing measurement relaxation; and skipping performing measurement enhancement.

Further, the measurement module is further configured to: in a case that the target measurement is performed on a plurality of resources simultaneously and a first resource of the plurality of resources satisfies at least one of the first conditions, perform the first target operation on a second resource, where the second resource is one of the following resources:

the first resource, the plurality of resources, and part of the plurality of resources, where the part of the plurality of resources include the first resource.

Further, the plurality of resources include at least one of the following resources:

a plurality of beams;

a plurality of bandwidth parts;

a plurality of transmission-reception points;

a plurality of cells, carriers, or component carriers;

a plurality of reference signals;

a plurality of reference signal sets; and a plurality of cell groups.

In this embodiment of this application, in a case that the first condition is satisfied, the terminal performs the first target operation. In this way, when the terminal determines that a received configuration from the network side has changed, the terminal performs a corresponding return operation to quickly return to a normal measurement mode, thereby implementing power saving without affecting performance of the target measurement and mobility performance of the terminal.

Further, the apparatus further includes:

a sending module, configured to send user assistance information to the network side, where the user assistance information is used to indicate a user-expected measurement parameter and/or adjustment parameter for the target measurement.

Further, the measurement parameter includes at least one of the following:

a user-expected threshold for a related timer before the measurement adjustment;

a user-expected threshold for a related counter before the measurement adjustment;

a user-expected threshold for a related timer after the measurement adjustment;

a user-expected threshold for a related counter after the measurement adjustment;

a user-expected measurement period before the measurement adjustment;

a user-expected measurement period after the measurement adjustment;

a user-expected measurement gap before the measurement adjustment;

a user-expected measurement gap after the measurement adjustment;

a user-expected measurement requirement before the measurement adjustment;

a user-expected measurement requirement after the measurement adjustment;

a user-expected duration for not performing measurement;

a user-expected duration for keeping measurement;

a user-expected requirement parameter for the target measurement; and a user-expected scaling factor after measurement adjustment.

Further, the adjustment parameter includes at least one of the following:

a user-expected trigger condition for the measurement adjustment;

a user-expected threshold for a corresponding counter for determining to enter or exit the measurement adjustment;

a user-expected threshold for a corresponding timer for determining to enter or exit the measurement adjustment; and user-expected measurement adjustment.

Further, the receiving module is further configured to obtain, from the network side, a configuration for sending the user assistance information.

Further, the target measurement includes at least one of the following:

measurement corresponding to radio link monitoring;

measurement corresponding to beam failure detection; and measurement corresponding to radio resource management.

In this embodiment of this application, the terminal sends the user assistance information to the network side, where the user assistance information is used to indicate the user-expected measurement parameter and/or adjustment parameter for the target measurement, so that the network side configures the measurement parameter and adjustment parameter for the target measurement based on the user assistance information, so as to configure an appropriate measurement parameter and adjustment parameter more accurately and dynamically for the terminal.

The monitoring behavior adjustment apparatus in this embodiment of this application may be an apparatus, or may be a component, an integrated circuit, or a chip in a terminal. The apparatus may be a mobile terminal or a non-mobile terminal. For example, the mobile terminal may include but is not limited to the types of the terminal 11 listed above, and the non-mobile terminal may be a server, a network attached storage (NAS), a personal computer (PC), a television (TV), a teller machine, a self-service machine, or the like, which is not specifically limited in this embodiment of this application.

The monitoring behavior adjustment apparatus in this embodiment of this application may be an apparatus with an operating system. The operating system may be an Android operating system, an iOS operating system, or other possible operating systems, and is not specifically limited in the embodiments of this application.

The monitoring behavior adjustment apparatus provided in this embodiment of this application is capable of implementing the processes implemented in the method embodiments in FIG. 2 to FIG. 4, with the same technical effects achieved. To avoid repetition, details are not described herein again.

Figure 6:
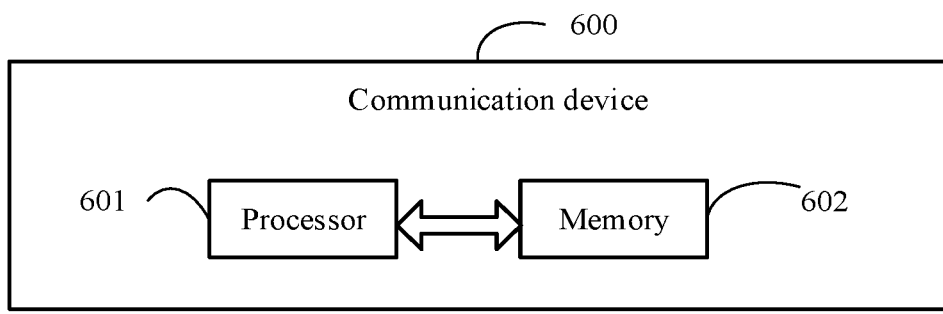
FIG. 6 is a schematic structural diagram of a communication device according to an embodiment of this application.

Optionally, as shown in FIG. 6, an embodiment of this application further provides a communication device 600, including a processor 601, a memory 602, and a program or instructions stored in the memory 602 and capable of running on the processor 601. For example, when the communication device 600 is a terminal and when the program or the instructions are executed by the processor 601, the processes of the foregoing embodiment of the monitoring behavior adjustment method are implemented, with the same technical effects achieved. When the communication device 600 is a network-side device and when the program or the instructions are executed by the processor 601, the processes of the foregoing embodiment of the monitoring behavior adjustment method are implemented, with the same technical effects achieved. To avoid repetition, details are not described herein again.

Figure 7:
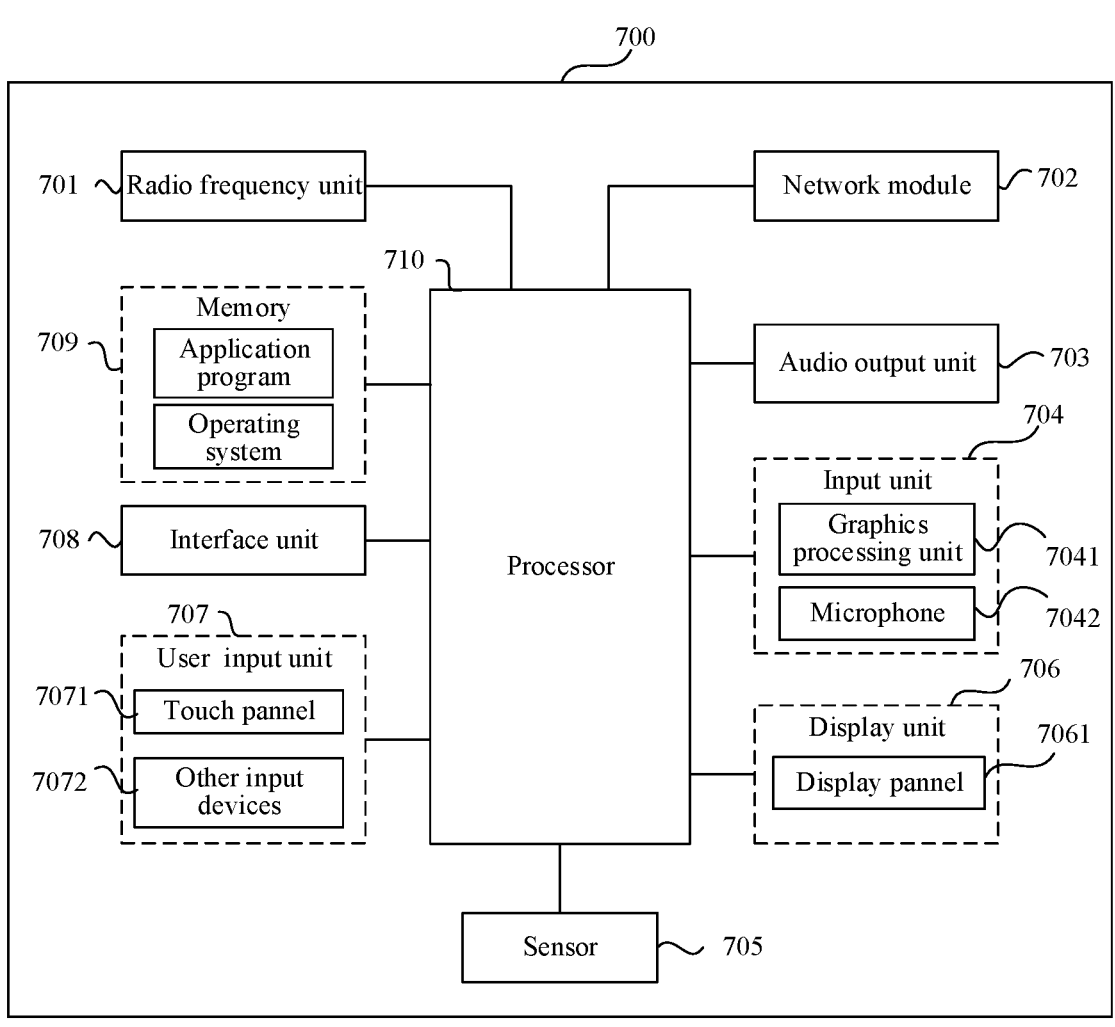
FIG. 7 is a schematic diagram of a hardware structure of a terminal for implementing the embodiments of this application.

FIG. 7 is a schematic diagram of a hardware structure of a terminal for implementing the embodiments of this application.

The terminal 700 includes but is not limited to components such as a radio frequency unit 701, a network module 702, an audio output unit 703, an input unit 704, a sensor 705, a display unit 706, a user input unit 707, an interface unit 708, a memory 709, and a processor 710.

Persons skilled in the art can understand that the terminal 700 may further include a power supply (for example, a battery) supplying power to the components, and the power supply may be logically connected to the processor 710 through a power management system. In this way, functions such as charge management, discharge management, and power consumption management are implemented by using the power management system. The structure of the terminal shown in FIG. 7 does not constitute any limitation on the terminal. The terminal may include more or fewer components than shown in FIG. 7, or a combination of some components, or the components disposed differently. Details are not described herein again.

It can be understood that in this embodiment of this application, the input unit 704 may include a graphics processing unit (GPU) 7041 and a microphone 7042. The graphics processing unit 7041 processes image data of a still picture or video obtained by an image capture apparatus (such as a camera) in a video capture mode or an image capture mode. The display unit 706 may include a display panel 7061, and the display panel 7061 may be configured in a form of a liquid crystal display, an organic light-emitting diode, and the like. The user input unit 707 may include a touch panel 7071 and other input devices 7072. The touch panel 7071 is also referred to as a touchscreen. The touch panel 7071 may include two parts: a touch detection apparatus and a touch controller. The other input devices 7072 may include but are not limited to a physical keyboard, a function button (such as a volume control button or a power on/off button), a trackball, a mouse, a joystick, and the like. Details are not described herein.

In this embodiment of this application, the radio frequency unit 701 receives downlink data from a network-side device, and then sends the downlink data to the processor 710 for processing; and also sends uplink data to the network-side device. Generally, the radio frequency unit 701 includes but is not limited to an antenna, at least one amplifier, a transceiver, a coupler, a low noise amplifier, a duplexer, and the like.

The memory 709 may be configured to store software programs or instructions and various data. The memory 709 may include a program or instruction storage area and a data storage area. The program or instruction storage area may store an operating system, an application program or instructions required by at least one function (for example, a sound playback function or an image playback function), and the like. In addition, the memory 709 may include a high-speed random access memory, and may further include a non-volatile memory. The non-volatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory, for example, at least one disk storage device, a flash memory device, or another volatile solid-state storage device.

The processor 710 may include one or more processing units. Optionally, an application processor and a modem processor may be integrated in the processor 710. The application processor primarily processes an operating system, user interfaces, application programs or instructions, and the like. The modem processor primarily processes radio communication, for example, being a baseband processor. It can be understood that the modem processor may alternatively be not integrated in the processor 710.

The radio frequency unit 701 is configured to obtain a measurement parameter and an adjustment parameter for a target measurement that are configured by a network side.

Optionally, the target measurement includes at least one of the following:

measurement corresponding to radio link monitoring;

measurement corresponding to beam failure detection; and measurement corresponding to radio resource management.

The processor 710 is configured to perform a first target operation.

The first target operation includes at least one of the following operations:

stopping corresponding counting and/or timing for determining to enter the measurement adjustment;

stopping corresponding counting and/or timing for determining to exit the measurement adjustment;

restarting corresponding counting and/or timing for determining to enter the measurement adjustment;

restarting corresponding counting and/or timing for determining to exit the measurement adjustment;

returning to the normal measurement;

skipping performing measurement relaxation;

skipping performing measurement enhancement; and performing measurement adjustment on the target measurement based on the measurement parameter and adjustment parameter for the target measurement, where the measurement adjustment is adjusting a mode of the target measurement, and the mode of the target measurement includes measurement relaxation, measurement enhancement, or normal measurement.

In this embodiment of this application, the terminal obtains the measurement parameter and adjustment parameter for the target measurement that are configured by the network side, and performs the first target operation to implement measurement adjustment on the target measurement based on the measurement parameter and adjustment parameter for the target measurement, so that the terminal can quickly return to a normal measurement mode when the configuration has changed, thereby quickly adapting to a network configuration. This implements power saving without affecting performance of the target measurement and mobility performance of the terminal.

Optionally, the processor 710 is further configured to perform the first target operation in a case that at least one of first conditions is satisfied.

The first conditions include the following conditions:

the measurement parameter has changed;

the adjustment parameter has changed;

a serving cell has changed;

a status of the serving cell has changed;

a transmission configuration indicator state of a control resource set indicated by the network side has changed;

downlink control information indicates bandwidth part switching; and a timer controls bandwidth part switching.

Optionally, that the serving cell has changed includes at least one of the following:

reconfiguration occurs in the serving cell;

synchronous reconfiguration occurs in the serving cell;

a primary cell has been switched;

a primary secondary cell has changed; and a secondary cell has changed.

Optionally, that the serving cell has changed includes: a cell status of at least one of the following serving cells is switched between a plurality of states.

The serving cell includes a secondary cell, a primary secondary cell, a secondary cell group, a primary cell, and a master cell group.

The plurality of states include at least one of the following:

activation, deactivation, dormancy, and suspend.

Optionally, in a case that corresponding counting and/or timing for determining to enter the measurement adjustment is performed or corresponding counting and/or timing for determining to exit the measurement adjustment is performed, the first target operation includes at least one of the following operations:

stopping corresponding counting and/or timing for determining to enter the measurement adjustment;

stopping corresponding counting and/or timing for determining to exit the measurement adjustment;

restarting corresponding counting and/or timing for determining to enter the measurement adjustment; and restarting corresponding counting and/or timing for determining to exit the measurement adjustment.

Optionally, in a case that the target measurement is measurement relaxation or measurement enhancement, the first target operation includes at least one of the following operations:

stopping corresponding counting and/or timing for determining to enter the measurement adjustment;

stopping corresponding counting and/or timing for determining to exit the measurement adjustment;

restarting corresponding counting and/or timing for determining to enter the measurement adjustment;

restarting corresponding counting and/or timing for determining to exit the measurement adjustment;

returning to the normal measurement;

skipping performing measurement relaxation; and skipping performing measurement enhancement.

Optionally, the performing the first target operation in a case that at least one of first conditions is satisfied includes:

in a case that the target measurement is performed on a plurality of resources simultaneously and a first resource of the plurality of resources satisfies at least one of the first conditions, performing the first target operation on a second resource, where the second resource is one of the following resources:

the first resource;

the plurality of resources; and part of the plurality of resources, where the part of the plurality of resources include the first resource.

Optionally, the plurality of resources include at least one of the following resources:

a plurality of beams;

a plurality of bandwidth parts;

a plurality of transmission-reception points;

a plurality of cells, carriers, or component carriers;

a plurality of reference signals;

a plurality of reference signal sets; and a plurality of cell groups.

In this embodiment of this application, in a case that the first condition is satisfied, the terminal performs the first target operation. In this way, when the terminal determines that a received configuration from the network side has changed, the terminal performs a corresponding return operation to quickly return to a normal measurement mode, thereby implementing power saving without affecting performance of the target measurement and mobility performance of the terminal.

Optionally, the radio frequency unit 701 is further configured to send user assistance information to the network side, where the user assistance information is used to indicate a user-expected measurement parameter and/or adjustment parameter for the target measurement.

Optionally, the measurement parameter includes at least one of the following:

a user-expected threshold for a related timer before the measurement adjustment;

a user-expected threshold for a related counter before the measurement adjustment;

a user-expected threshold for a related timer after the measurement adjustment;

a user-expected threshold for a related counter after the measurement adjustment;

a user-expected measurement period before the measurement adjustment;

a user-expected measurement period after the measurement adjustment;

a user-expected measurement gap before the measurement adjustment;

a user-expected measurement gap after the measurement adjustment;

a user-expected measurement requirement before the measurement adjustment;

a user-expected measurement requirement after the measurement adjustment;

a user-expected duration for not performing measurement;

a user-expected duration for keeping measurement;

a user-expected requirement parameter for the target measurement; and a user-expected scaling factor after measurement adjustment.

Optionally, the adjustment parameter includes at least one of the following:

a user-expected trigger condition for the measurement adjustment;

a user-expected threshold for a corresponding counter for determining to enter or exit the measurement adjustment;

a user-expected threshold for a corresponding timer for determining to enter or exit the measurement adjustment; and user-expected measurement adjustment.

Optionally, the radio frequency unit 701 is further configured to obtain, from the network side, a configuration for sending the user assistance information.

In this embodiment of this application, the terminal sends the user assistance information to the network side, where the user assistance information is used to indicate the user-expected measurement parameter and/or adjustment parameter for the target measurement, so that the network side configures the measurement parameter and adjustment parameter for the target measurement based on the user assistance information, so as to configure an appropriate measurement parameter and adjustment parameter more accurately and dynamically for the terminal.

An embodiment of this application further provides a readable storage medium, where a program or instructions are stored in the readable storage medium. When the program or the instructions are executed by a processor, the processes of the foregoing embodiment of the monitoring behavior adjustment method can be implemented, with the same technical effects achieved. To avoid repetition, details are not described herein again.

The processor is a processor in the terminal described in the foregoing embodiments. The readable storage medium includes a computer-readable storage medium, for example, a computer read-only memory (ROM), a random access memory (RAM), a magnetic disk, or an optical disc.

An embodiment of this application further provides a chip, where the chip includes a processor and a communication interface. The communication interface is coupled to the processor, and the processor is configured to run a program or instructions of a network-side device to implement the processes of the foregoing embodiments of the monitoring behavior adjustment method, with the same technical effects achieved. To avoid repetition, details are not described herein again.

It should be understood that the chip mentioned in the embodiments of this application may also be referred to as a system-level chip, a system chip, a chip system, a system-on-chip, or the like.

It should be noted that the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element. In addition, it should be noted that the scope of the method and the apparatus in the embodiments of this application is not limited to executing the functions in an order shown or discussed, but may also include executing the functions in a substantially simultaneous manner or in a reverse order, depending on the functions involved. For example, the described methods may be performed in an order different from that described, and steps may alternatively be added, omitted, or combined. In addition, features described with reference to some examples may be combined in other examples.

According to the foregoing description of the implementations, persons skilled in the art may clearly understand that the methods in the foregoing embodiments may be implemented by using software in combination with a necessary common hardware platform, and certainly may alternatively be implemented by using hardware. However, in most cases, the former is a preferred implementation. Based on such an understanding, the technical solutions of this application essentially or the part contributing to the prior art may be implemented in a form of a software product. The software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of this application.

The foregoing describes the embodiments of this application with reference to the accompanying drawings. However, this application is not limited to the foregoing specific embodiments. The foregoing specific embodiments are merely illustrative rather than restrictive. As instructed by this application, persons of ordinary skill in the art may develop many other manners without departing from principles of this application and the protection scope of the claims, and all such manners fall within the protection scope of this application.

What is claimed is:

1. A monitoring behavior adjustment method, executed by a terminal and comprising:

obtaining a measurement parameter and an adjustment parameter for a target measurement that are configured by a network side; and performing measurement adjustment on the target measurement based on the measurement parameter and adjustment parameter for the target measurement, wherein the measurement adjustment is adjusting a mode of the target measurement, and the mode of the target measurement comprises measurement relaxation, measurement enhancement, or normal measurement;

wherein after the obtaining a measurement parameter and an adjustment parameter for a target measurement that are configured by a network side, the method further comprises:

performing a first target operation;

wherein the first target operation comprises at least one of the following operations:

restarting at least one of corresponding counting or timing for determining to enter the measurement adjustment;

returning to the normal measurement; or skipping performing measurement relaxation;

wherein the performing a first target operation comprises:

performing the first target operation in a case that at least one of first conditions is satisfied, wherein the first conditions comprise the following conditions:

the adjustment parameter has changed;

a serving cell has changed;

a status of the serving cell has changed.

2. The method according to claim 1, wherein that the serving cell has changed comprises at least one of the following:

reconfiguration occurs in the serving cell;

synchronous reconfiguration occurs in the serving cell;

a primary cell has been switched;

a primary secondary cell has changed; or, a secondary cell has changed.

3. The method according to claim 1, wherein that the serving cell has changed comprises: a cell status of at least one of the following serving cells is switched between a plurality of states; wherein the serving cell comprises a secondary cell, a primary secondary cell, a secondary cell group, a primary cell, or a master cell group; and the plurality of states comprises at least one of the following:

activation, deactivation, dormancy, or suspend.

4. The method according to claim 1, wherein in a case that at least one of corresponding counting or timing for determining to enter the measurement adjustment is performed or at least one of corresponding counting or timing for determining to exit the measurement adjustment is performed, the first target operation comprises:

restarting at least one of corresponding counting or timing for determining to enter the measurement adjustment.

5. The method according to claim 1, wherein in a case that the target measurement is measurement relaxation or measurement enhancement, the first target operation comprises at least one of the following operations:

restarting at least one of corresponding counting or timing for determining to enter the measurement adjustment;

returning to the normal measurement; or skipping performing measurement relaxation.

6. The method according to claim 1, wherein the performing the first target operation in a case that at least one of first conditions is satisfied comprises:

in a case that the target measurement is performed on a plurality of resources simultaneously and a first resource of the plurality of resources satisfies at least one of the first conditions, performing the first target operation on a second resource, wherein the second resource is one of the following resources:

the first resource;

the plurality of resources; or, part of the plurality of resources, wherein the part of the plurality of resources comprise the first resource.

7. The method according to claim 6, wherein the plurality of resources comprise at least one of the following resources:

a plurality of beams;

a plurality of bandwidth parts;

a plurality of transmission-reception points;

a plurality of cells, carriers, or component carriers;

a plurality of reference signals;

a plurality of reference signal sets; or, a plurality of cell groups.

8. The method according to claim 1, wherein the method further comprises:

sending user assistance information to the network side, wherein the user assistance information is used to indicate at least one of a user-expected measurement parameter or adjustment parameter for the target measurement.

9. The method according to claim 8, wherein the measurement parameter comprises at least one of the following:

a user-expected threshold for a related timer before the measurement adjustment;

a user-expected threshold for a related counter before the measurement adjustment;

a user-expected threshold for a related timer after the measurement adjustment;

a user-expected threshold for a related counter after the measurement adjustment;

a user-expected measurement period before the measurement adjustment;

a user-expected measurement period after the measurement adjustment;

a user-expected measurement gap before the measurement adjustment;

a user-expected measurement gap after the measurement adjustment;

a user-expected measurement requirement before the measurement adjustment;

a user-expected measurement requirement after the measurement adjustment;

a user-expected duration for not performing measurement;

a user-expected duration for keeping measurement;

a user-expected requirement parameter for the target measurement; or, a user-expected scaling factor after measurement adjustment.

10. The method according to claim 8, wherein the adjustment parameter comprises at least one of the following:

a user-expected trigger condition for the measurement adjustment;

a user-expected threshold for a corresponding counter for determining to enter or exit the measurement adjustment;

a user-expected threshold for a corresponding timer for determining to enter or exit the measurement adjustment; or, user-expected measurement adjustment.

11. The method according to claim 8, wherein before the sending user assistance information to the network side, the method further comprises:

obtaining, from the network side, a configuration for sending the user assistance information.

12. The method according to claim 1, wherein the target measurement comprises at least one of the following:

measurement corresponding to radio link monitoring;

measurement corresponding to beam failure detection; or, measurement corresponding to radio resource management.

13. A terminal, comprising a processor, a memory, and a program or instructions stored in the memory and capable of running on the processor, wherein when the program or the instructions are executed by the processor, following steps are implemented:

obtaining a measurement parameter and an adjustment parameter for a target measurement that are configured by a network side; and performing measurement adjustment on the target measurement based on the measurement parameter and adjustment parameter for the target measurement, wherein the measurement adjustment is adjusting a mode of the target measurement, and the mode of the target measurement comprises measurement relaxation, measurement enhancement, or normal measurement;

wherein when the program or the instructions are executed by the processor, following step is implemented:

after the obtaining a measurement parameter and an adjustment parameter for a target measurement that are configured by a network side, performing a first target operation;

wherein the first target operation comprises at least one of the following operations:

restarting at least one of corresponding counting or timing for determining to enter the measurement adjustment;

returning to the normal measurement; or skipping performing measurement relaxation;

wherein the performing a first target operation comprises:

performing the first target operation in a case that at least one of first conditions is satisfied, wherein the first conditions comprise the following conditions:

the adjustment parameter has changed;

a serving cell has changed;

a status of the serving cell has changed.

14. The terminal according to claim 13, wherein that the serving cell has changed comprises at least one of the following:

reconfiguration occurs in the serving cell;

synchronous reconfiguration occurs in the serving cell;

a primary cell has been switched;

a primary secondary cell has changed; or, a secondary cell has changed.

15. The terminal according to claim 13, wherein that the serving cell has changed comprises: a cell status of at least one of the following serving cells is switched between a plurality of states; wherein the serving cell comprises a secondary cell, a primary secondary cell, a secondary cell group, a primary cell, or a master cell group; and the plurality of states comprises at least one of the following:

activation, deactivation, dormancy, or suspend.

16. The terminal according to claim 13, wherein in a case that at least one of corresponding counting or timing for determining to enter the measurement adjustment is performed or at least one of corresponding counting or timing for determining to exit the measurement adjustment is performed, the first target operation comprises:

restarting at least one of corresponding counting or timing for determining to enter the measurement adjustment; or, wherein in a case that the target measurement is measurement relaxation or measurement enhancement, the first target operation comprises at least one of the following operations: restarting at least one of corresponding counting or timing for determining to enter the measurement adjustment; returning to the normal measurement; or skipping performing measurement relaxation; or, wherein the performing the first target operation in a case that at least one of first conditions is satisfied comprises: in a case that the target measurement is performed on a plurality of resources simultaneously and a first resource of the plurality of resources satisfies at least one of the first conditions, performing the first target operation on a second resource, wherein the second resource is one of the following resources:

the first resource;

the plurality of resources; or, part of the plurality of resources, wherein the part of the plurality of resources comprise the first resource.

\* \* \* \* \*